United States Patent
Sato et al.

(10) Patent No.: US 9,337,519 B2
(45) Date of Patent: May 10, 2016

(54) AIR BATTERY HAVING AN ELECTRODE AND POLYMER FILM

(75) Inventors: Takashi Sato, Tsukuba (JP); Taketsugu Yamamoto, Tsukuba (JP)

(73) Assignee: SUMITOMO CHEMICAL COMPANY, LIMITED, Tokyo (JP)

( * ) Notice: Subject to any disclaimer, the term of this patent is extended or adjusted under 35 U.S.C. 154(b) by 1116 days.

(21) Appl. No.: 13/391,183

(22) PCT Filed: Aug. 12, 2010

(86) PCT No.: PCT/JP2010/063709
§ 371 (c)(1),
(2), (4) Date: May 2, 2012

(87) PCT Pub. No.: WO2011/021569
PCT Pub. Date: Feb. 24, 2011

(65) Prior Publication Data
US 2012/0214074 A1    Aug. 23, 2012

(30) Foreign Application Priority Data

Aug. 18, 2009   (JP) .................................. 2009-189361

(51) Int. Cl.
*H01M 8/22* (2006.01)
*H01M 12/06* (2006.01)

(52) U.S. Cl.
CPC ..................... *H01M 12/06* (2013.01)

(58) Field of Classification Search
CPC .......... H01M 12/06; H01M 8/22; H01M 8/10
USPC ....................................................... 429/403
See application file for complete search history.

(56) References Cited

U.S. PATENT DOCUMENTS

| 2007/0077485 | A1 | 4/2007 | Takamura et al. |
| 2008/0299456 | A1* | 12/2008 | Shiga et al. .................. 429/212 |
| 2012/0028136 | A1 | 2/2012 | Sato et al. |

FOREIGN PATENT DOCUMENTS

| CN | 1910783 A | 2/2007 |
| JP | 58-223405 A | 12/1983 |

(Continued)

OTHER PUBLICATIONS

Chinese Office Action for Chinese Application No. 201080036572.5 issued Oct. 8, 2013, with English translation.
International Search Report, dated Nov. 22, 2010, for Application No. PCT/JP2010/063709.
Kouzai et al., "Polymerization and Polymer Properties of Diarylacetylenes", Polymer, vol. 35, No. 22, 1994, pp. 4920-4923.

(Continued)

*Primary Examiner* — Gary Harris
(74) *Attorney, Agent, or Firm* — Birch, Stewart, Kolasch & Birch, LLP

(57) ABSTRACT

An air battery containing an electrode and a polymer film, wherein the polymer film is disposed on the air intake side of the electrode, and the polymer film is a film of a polymer comprising a repeating unit represented by the following formula (1),

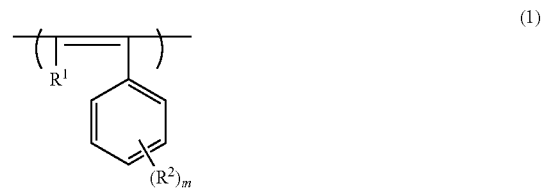

(1)

wherein $R^1$, $R^2$, and m are defined in the specification.

7 Claims, 1 Drawing Sheet

(56) References Cited

FOREIGN PATENT DOCUMENTS

| | | |
|---|---|---|
| JP | 59-19506 A | 2/1984 |
| JP | 1-267974 A | 10/1989 |
| JP | 3-108256 A | 5/1991 |
| JP | 5-47421 A | 2/1993 |
| JP | 6-246143 A | 9/1994 |
| JP | 2007287343 A * | 11/2007 |
| JP | 2011-38051 A | 2/2011 |
| WO | WO 2010/104043 A1 | 9/2010 |

OTHER PUBLICATIONS

International Preliminary Report on Patentability for International Patent Application No. PCT/JP2010/063709, mailed on Mar. 22, 2012.

The Second Office Action (including English translation), dated Apr. 23, 2014, issued in the corresponding Chinese Patent Application No. 201080036572.5.

* cited by examiner

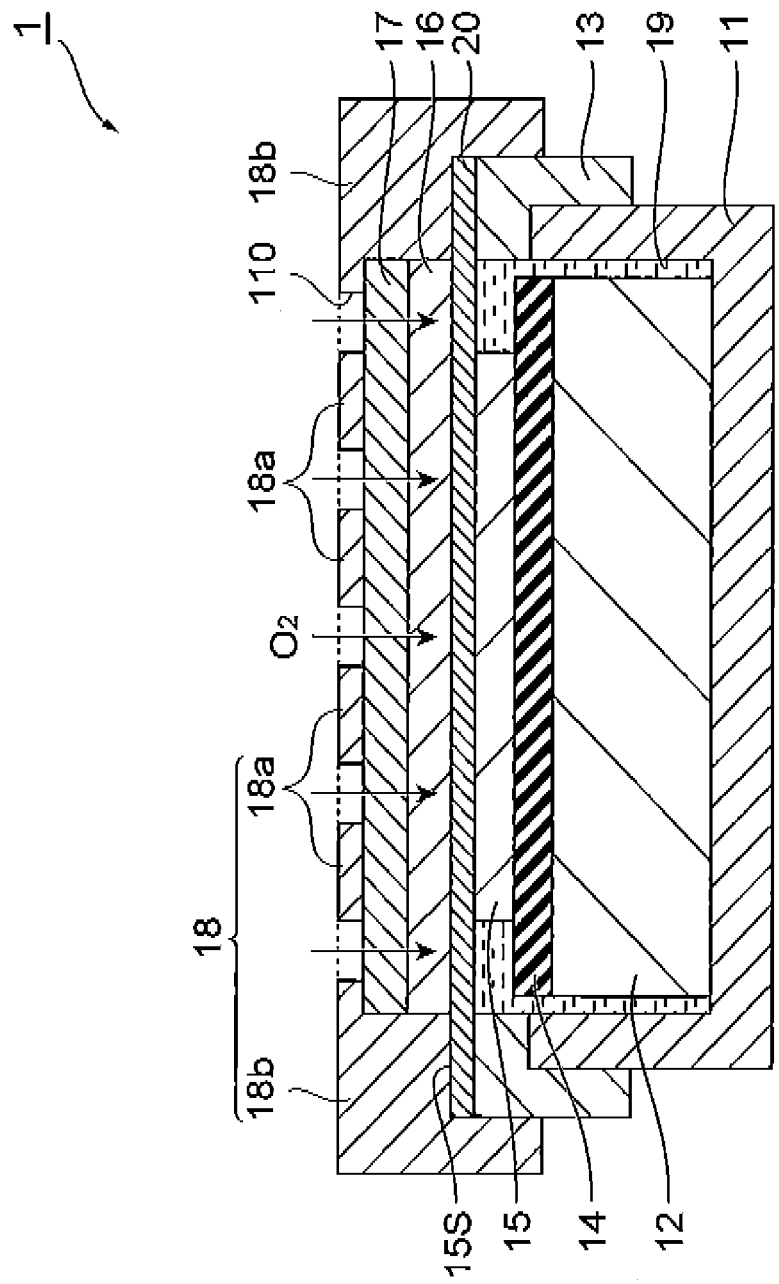

AIR BATTERY HAVING AN ELECTRODE AND POLYMER FILM

TECHNICAL FIELD

The present invention relates to an air battery.

BACKGROUND ART

An air battery is a battery having oxygen as an active material. The air battery has air holes for intake of air and electrodes (air electrodes) that react with oxygen in the received air. Such an air battery generates electricity using oxygen in the air as the active material.

A thin-film is used to selectively extract oxygen from air drawn in through the air holes. Patent document 1 proposes providing a polysiloxane thin-film between the air holes and the air electrodes, while Patent document 2 proposes providing a polyimide thin-film.

CITATION LIST

Patent Literature

[Patent document 1] JP 01-267974A
[Patent document 2] JP 03-108256A

SUMMARY OF INVENTION

Technical Problem

These thin-films, however, have not been sufficient in terms of the oxygen permeability coefficient, and it is therefore difficult to supply sufficient oxygen. Consequently, air batteries employing such films do not easily exhibit sufficient discharge performance.

It is an object of the present invention to provide an air battery that has sufficient discharge performance.

Solution to Problem

The air battery of the invention comprises an electrode and a polymer film. The polymer film is disposed on the air intake side of the electrode, and the polymer film is a film of a polymer comprising a repeating unit represented by the following formula (1). The air battery of the invention has a construction in which gas in air passes through the polymer film and reaches the electrode.

[Chemical Formula 1]

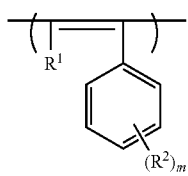

(1)

In formula (1), $R^1$ represents a hydrogen, a halogeno group, a substituted or unsubstituted alkyl group, a substituted or unsubstituted aromatic hydrocarbon group, a substituted or unsubstituted aromatic heterocyclic group, a trialkylsilyl group, or a trialkylgermyl group, each $R^2$ is independently represented by the following formula (2), m is an integer of from 1 to 5, and when a plurality of $R^2$s are present, the $R^2$s may be the same as or different from each other.

[Chemical Formula 2]

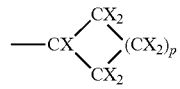

(2)

In formula (2), each X is independently a monovalent group, the plurality of Xs may be the same as or different from each other, at least one X is a monovalent group containing a halogen atom, and p is an integer of from 0 to 10.

According to the invention, the polymer film is superior in terms of both oxygen permeability and oxygen permeation selectivity relative to nitrogen permeation (hereunder may be referred to as "oxygen/nitrogen selective permeability"). By disposing the polymer film on the air intake side of the electrode in the air battery, it is possible to efficiently take in oxygen gas while suppressing permeation of nitrogen in the air battery. It is thus possible to obtain an air battery with sufficient discharge performance, and especially an air battery with high output.

According to the invention, at least one X is preferably a halogeno group, and more preferably at least one X is a fluoro group. All of X are preferably halogeno groups, and more preferably all of X are fluoro groups.

Thereby, there is an effect of further improving the oxygen/nitrogen selective permeability of the polymer film due to further increase of the affinity between the polymer and oxygen, and the heat resistance of the polymer is improved as well.

According to the invention, $R^1$ is preferably an unsubstituted phenyl or a substituted phenyl group represented by the following formula (3).

[Chemical Formula 3]

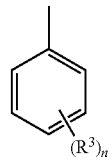

(3)

In formula (3), each $R^3$ independently represents a monovalent group, n is an integer of from 1 to 5, and when a plurality of $R^3$s are present, the $R^3$ may be the same as or different from each other.

If $R^1$ has such a structure, the oxygen permeability of the polymer film and the oxygen/nitrogen selective permeability of the polymer can be further improved, and aging deterioration of the polymer film can be suppressed.

$R^3$ is preferably a halogeno group, a substituted or unsubstituted alkyl group, a substituted or unsubstituted aromatic hydrocarbon group, a substituted or unsubstituted aromatic heterocyclic group, a trialkylsilyl group, or a trialkylgermyl group, thereby still further improving the oxygen permeability of the polymer film and the oxygen/nitrogen selective permeability of the polymer film, and aging deterioration of the polymer can also be suppressed.

$R^3$ is more preferably a halogeno group, a substituted or unsubstituted alkyl group, or a trialkylsilyl group, even more preferably a fluoro group or a trimethylsilyl group, and most preferably a trimethylsilyl group. Thereby, the oxygen permeability and oxygen/nitrogen selective permeability of the polymer film are still further improved and aging deterioration of the polymer film can be suppressed, and it also results in superior film formability due to better solubility in various organic solvents.

$R^1$ is preferably an unsubstituted phenyl group, in which case the poor solubility of the polymer in solvents makes it easier to realize a polymer film with high resistance to solvents.

Advantageous Effects of Invention

According to the invention, it is possible to efficiently take in oxygen gas while suppressing permeation of nitrogen in the air battery. The invention can thus provide an air battery with sufficient discharge performance, and especially an air battery with high output.

BRIEF DESCRIPTION OF DRAWINGS

FIG. 1 is a schematic cross-sectional view of an air battery according to an embodiment of the invention.

DESCRIPTION OF EMBODIMENTS

A preferred embodiment of the invention will now be described in detail.
[Polymer]
The polymer composing the polymer film of this embodiment has a repeating unit represented by the following formula (1).

[Chemical Formula 4]

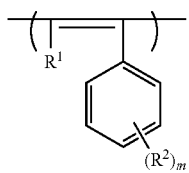

(1)

The polymer comprises a plurality of repeating units represented by formula (1), and the plurality of repeating units may have the lateral positions of $R^1$ and the $(R^2)_m$-introduced phenyl group reversed to each other. The plurality of repeating units represented in the polymer may each independently be cis or trans forms. C is or trans forms can be identified by Raman spectrophotometry of the polymer film.

(Functional Group $R^1$)
In formula (1), $R^1$ represents a hydrogen atom, a halogeno group, a substituted or unsubstituted alkyl group, a substituted or unsubstituted aromatic hydrocarbon group, a substituted or unsubstituted aromatic heterocyclic group, a trialkylsilyl group, or a trialkylgermyl group.

Throughout the present specification, an "aromatic hydrocarbon group" refers to an atomic group remaining after removing a hydrogen atom bonded to a carbon atom composing the aromatic ring of an aromatic hydrocarbon. An "aromatic heterocyclic group" refers to an atomic group remaining after removing a hydrogen atom bonded to a carbon atom or a heteroatom composing the aromatic heterocycle of an aromatic heterocyclic compound. An "aromatic heterocyclic compound" refers to an organic compound having an aromatic cyclic structure, wherein the elements composing the ring include not only carbon atoms but also a heteroatom such as an oxygen atom, sulfur atom, nitrogen atom, phosphorus atom, boron atom, silicon atom, selenium atom, tellurium atom or arsenic atom.

Examples of a halogeno group as $R^1$ in formula (1) include a fluoro group, a chloro group, a bromo group, and an iodo group. Fluoro groups and chloro groups are preferred among these.

Examples of substituted or unsubstituted alkyl groups for $R^1$ in formula (1) include methyl group, ethyl group, propyl group, butyl group, pentyl group, hexyl group, isopropyl group, isobutyl group, tertiary butyl group, 1-methylpropyl group, isopentyl group, 1-methylbutyl group, 2-methylbutyl group, 1,1-dimethylpropyl group, 1-methylpentyl group, 1,1-dimethylpentyl group and 2-methylpentyl group, and these groups wherein some or all of the hydrogens have been replaced by halogeno groups. Specific examples of substituted alkyl groups include chloromethyl group, chloroethyl group, chloropropyl group, dichloromethyl group, dichloroethyl group, trichloromethyl group, bromomethyl group, bromoethyl group, bromopropyl group, dibromomethyl group, dibromoethyl group, monofluoromethyl group, monofluoroethyl group, trifluoromethyl group, perfluoroethyl group, perfluoropropyl group, perfluoroisopropyl group, perfluoroisobutyl group, perfluoro-1-methylpropyl group, perfluoropentyl group, perfluorobutyl group, perfluoroisopentyl group, perfluorohexyl group, perfluoroheptyl group, perfluorooctyl group, perfluorononyl group, perfluorodecyl group, perfluoroundecyl group and perfluorododecyl group. Among them perfluoro-substituted forms are preferred.

Examples of a substituted or unsubstituted aromatic hydrocarbon group for $R^1$ in formula (1) include unsubstituted aromatic hydrocarbon groups, and aromatic hydrocarbon groups substituted with a halogeno group, an alkoxy group, an alkyl group, a trialkylsilyl group, or a trialkylgermyl group.

Examples of aromatic hydrocarbon groups include those with fused rings, and those having 2 or more of independent benzene rings or fused rings bonded by a single bond or a divalent organic group. The number of carbon atoms in the aromatic hydrocarbon group is usually from 6 to 60, preferably from 6 to 30 and more preferably from 6 to 20. Examples of aromatic hydrocarbon groups include phenyl group, $C_1$-$C_{12}$ alkoxyphenyl group, $C_1$-$C_{12}$ alkylphenyl group, trialkylsilylphenyl group, trialkylgermyiphenyl group, 1-naphthyl group, 2-naphthyl group, 1-anthracenyl group, 2-anthracenyl group, 9-anthracenyl group, pyrenyl group, perylenyl group and pentafluorophenyl group, with phenyl group, $C_1$-$C_{12}$ alkylphenyl group and trialkylsilylphenyl group being preferred.

Examples of substituted or unsubstituted aromatic heterocyclic groups for $R^1$ in formula (1) include unsubstituted monovalent aromatic heterocyclic groups, and monovalent aromatic heterocyclic groups substituted with substituents such as alkyl groups.

The number of carbon atoms in a monovalent aromatic heterocyclic group is usually from 4 to 60, preferably from 4 to 30 and more preferably about from 4 to 20, not including the number of carbon atoms of the substituents. Monovalent aromatic heterocyclic groups include thiophenyl group, $C_1$-$C_{12}$ alkylthiophenyl group, pyrroyl group, furyl group, pyridyl group, $C_1$-$C_{12}$ alkylpyridyl group, pyridazyl group, pyrimidyl group and pyrazinyl group.

Examples of trialkylsilyl groups for $R^1$ in formula (1) include trimethylsilyl group, triethylsilyl group, tri-isopropylsilyl group, dimethyl-isopropylsilyl group, diethyl-isopropylsilyl group, pentyldimethylsilyl group, hexyldimethylsilyl group, heptyldimethylsilyl group, octyldimethylsilyl group, octyldiethylsilyl group, 2-ethylhexyldimethylsilyl group, nonyldimethylsilyl group, decyldimethylsilyl group, 3,7-dimethyloctyl-dimethylsilyl group and dodecyldimethylsilyl group.

Examples of trialkylgermyl groups for $R^1$ in formula (1) include trimethylgermyl group, triethylgermyl group, tri-isopropylgermyl group, dimethyl-isopropylgermyl group, diethyl-isopropylgermyl group, pentyldimethylgermyl group, hexyldimethylgermyl group, heptyldimethylgermyl group, octyldimethylgermyl group, octyldiethylgermyl group, 2-ethylhexyldimethylgermyl group, nonyldimethylgermyl group, decyldimethylgermyl group, 3,7-dimethyloctyl-dimethylgermyl group and dodecyldimethylgermyl group.

$R^1$ is preferably unsubstituted phenyl group or a substituted phenyl group represented by the following formula (3).

[Chemical Formula 5]

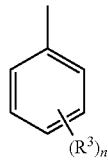

(3)

In formula (3), each $R^3$ independently represents a monovalent group, n is an integer of from 1 to 5, and when a plurality of $R^3$s are present, the $R^3$s may be the same as or different from each other.

If $R^1$ is one of these structures, it is possible to further improve the oxygen/nitrogen selective permeability of the polymer film and suppress aging deterioration in the polymer film.

$R^3$ may be bonded at the para position, meta position or ortho position with respect to the carbon atom bonded to the main chain of the polymer among the carbon atoms composing the benzene ring in formula (3), and it may be selected as appropriate.

The monovalent group as $R^3$ in formula (3) is preferably a halogeno group, a substituted or unsubstituted alkyl group, a substituted or unsubstituted aromatic hydrocarbon group, a substituted or unsubstituted aromatic heterocyclic group, a trialkylsilyl group, or a trialkylgermyl group.

If $R^3$ is one of these structures, it is possible to further improve the oxygen/nitrogen selective permeability of the polymer film and suppress aging deterioration in the polymer film.

Examples of a halogeno group as $R^3$ in formula (3) include a fluoro group, a chloro group, a bromo group, or an iodo group, and is preferably a fluoro group, and a chloro group.

Examples of substituted or unsubstituted alkyl groups for $R^3$ in formula (3) include methyl group, ethyl group, propyl group, butyl group, pentyl group, hexyl group, isopropyl group, isobutyl group, tertiary butyl group, 1-methylpropyl group, isopentyl group, 1-methylbutyl group, 2-methylbutyl group, 1,1-dimethylpropyl group, 1-methylpentyl group, 1,1-dimethylpentyl group and 2-methylpentyl group, and these groups wherein some or all of the hydrogens have been replaced by halogeno groups. Specific examples of substituted alkyl groups include chloromethyl group, chloroethyl group, chloropropyl group, dichloromethyl group, dichloroethyl group, trichloromethyl group, bromomethyl group, bromoethyl group, bromopropyl group, dibromomethyl group, dibromoethyl group, monofluoromethyl group, monofluoroethyl group, trifluoromethyl group, perfluoroethyl group, perfluoropropyl group, perfluoroisopropyl group, perfluoroisobutyl group, perfluoro-1-methylpropyl group, perfluoropentyl group, perfluorobutyl group, perfluoroisopentyl group, perfluorohexyl group, perfluoroheptyl group, perfluorooctyl group, perfluorononyl group, perfluorodecyl group, perfluoroundecyl group and perfluorododecyl group. Among them perfluoro-substituted forms are preferred.

Examples of a substituted or unsubstituted aromatic hydrocarbon group for $R^3$ in formula (3) include unsubstituted aromatic hydrocarbon groups, and aromatic hydrocarbon groups substituted with a halogeno group, an alkoxy group, an alkyl group, a trialkylsilyl group, or a trialkylgermyl group. Aromatic hydrocarbon groups also include those with fused rings, and those having 2 or more of independent benzene rings or fused rings bonded by a single bond or a divalent organic group. The number of carbon atoms in the aromatic hydrocarbon group is usually from 6 to 60, preferably from 6 to 30 and more preferably from 6 to –20. Examples of aromatic hydrocarbon groups include phenyl group, $C_1$-$C_{12}$ alkoxyphenyl group, $C_1$-$C_{12}$ alkylphenyl group, trialkylsilylphenyl group, trialkylgermylphenyl group, 1-naphthyl group, 2-naphthyl group, 1-anthracenyl group, 2-anthracenyl group, 9-anthracenyl group, pyrenyl group, perylenyl group and pentafluorophenyl group, with phenyl group, $C_1$-$C_{12}$ alkylphenyl group and trialkylsilylphenyl group being preferred.

Examples of substituted or unsubstituted aromatic heterocyclic groups for $R^3$ in formula (3) include unsubstituted monovalent aromatic heterocyclic groups, and monovalent aromatic heterocyclic groups substituted with substituents such as alkyl groups. The number of carbon atoms in a monovalent aromatic heterocyclic group is usually from 4 to 60, preferably from 4 to 30 and more preferably about from 4 to 20, not including the number of carbon atoms of the substituents. Monovalent aromatic heterocyclic groups include thiophenyl group, $C_1$-$C_{12}$ alkylthiophenyl group, pyrroyl group, furyl group, pyridyl group, $C_1$-$C_{12}$ alkylpyridyl group, pyridazyl group, pyrimidyl group and pyrazinyl group.

Specific examples of trialkylsilyl groups for $R^3$ in formula (3) include trimethylsilyl group, triethylsilyl group, tri-isopropylsilyl group, dimethyl-isopropylsilyl group, diethyl-isopropylsilyl group, pentyldimethylsiiyl group, hexyldimethylsilyl group, heptyldimethylsilyl group, octyldimethylsilyl group, octyldiethylsilyl group, 2-ethylhexyldimethylsilyl group, nonyldimethylsilyl group, decyldimethylsilyl group, 3,7-dimethyloctyl-dimethylsilyl group and dodecyldimethylsilyl group, with trimethylsilyl group, triethylsilyl group, tri-isopropylsilyl group, dimethyl-isopropylsilyl group and diethyl-isopropylsilyl group being preferred, and trimethylsilyl group and triethylsilyl group being more preferred.

Specific examples of trialkylgermyl groups for $R^3$ in formula (3) include trimethylgermyl group, triethylgermyl group, tri-isopropylgermyl group, dimethyl-isopropylgermyl group, diethyl-isopropylgermyl group, pentyldimethylgermyl group, hexyldimethylgermyl group, heptyldimethylgermyl group, octyldimethylgermyl group, octyldiethylgermyl group, 2-ethylhexyldimethylgermyl group, nonyldimethylgermyl group, decyldimethylgermyl group, 3,7-dimethyloctyl-dimethylgermyl group and dodecyldimethylgermyl group, with trimethylgermyl group, triethylgermyl group, tri-isopropylgermyl group, dimethyl-isopropylgermyl group and diethyl-isopropylgermyl group being preferred, and trimethylgermyl group and triethylgermyl group being more preferred.

From the viewpoints of oxygen/nitrogen selective permeability of the polymer film, the effect of suppressing aging deterioration of the polymer film and the film formability of the polymer, $R^3$ is preferably a halogeno group, a substituted or unsubstituted alkyl group, or a trialkylsilyl group, more preferably a fluoro group or a trimethylsilyl group, and even more preferably a trimethylsilyl group. Trialkylsilyl group and especially trimethylsilyl groups, in particular, can facilitate dissolution of the polymer in the solvent and result in further superior film formability for the film.

$R^1$ is also preferably an unsubstituted phenyl group. In this case, the poor solubility of the polymer in solvents makes it easier to realize a polymer film with high resistance to solvents.

(Functional Group $R^2$)

$R^2$ is represented by the following formula (2). In formula (1), m is an integer of from 1 to 5, and when a plurality of $R^2$s are present, the $R^2$s may be the same as or different from each other.

[Chemical Formula 6]

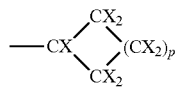

(2)

In formula (2), each X is independently a monovalent group, the plurality of Xs may be the same as or different from each other, at least one X is a monovalent group containing a halogen atom, and p is an integer of from 0 to 10.

Examples of monovalent groups containing a halogen atom include halogeno groups, halogenoalkyl groups, halogeno aromatic rings and halogeno aromatic heterocycles.

Examples of halogeno groups include fluoro group (—F), chloro group (—Cl), bromo group (—Br) and iodo group (—I).

Examples of halogenoalkyl groups include fluoroalkyl groups and chloroalkyl groups. Examples of fluoroalkyl groups include C1-15 perfluoroalkyl group, monofluoromethyl group, monofluoroethyl group and trifluoroethyl group. Examples of chloroalkyl groups include chloromethyl group, chloroethyl group, dichloroethyl group, chloropropyl group and trichloromethyl group.

There are no particular restrictions on groups for X that are monovalent groups with no halogen atoms, and examples include hydrogen atom, alkyl groups, branched alkyl groups, aromatic hydrocarbon groups and aromatic heterocyclic groups.

Preferably, at least one X is a halogeno group. More preferably, at least one X is a fluoro group. This allows an effect of further improving the oxygen/nitrogen selective permeability of the polymer film due to further increase of the affinity between the polymer and oxygen, and of improving the heat resistance of the polymer as well.

In formula (2), all of the X groups are preferably halogeno groups, and more preferably all of the X groups are fluoro groups. This allows an effect of still further improving the oxygen/nitrogen selective permeability of the polymer film due to still further increase of the affinity between the polymer and oxygen, and of improving the heat resistance of the polymer as well.

In formula (2), p is an integer of from 0 to 10, and from the viewpoints of improving the oxygen permeability coefficient and oxygen/nitrogen selective permeability and of suppressing moisture permeation, p is preferably an integer of from 2 to 5 and more preferably 3.

The polymer of the invention, due to comprising the repeating unit described above, is superior in terms of both oxygen permeability and oxygen/nitrogen selective permeability. The present inventors believe that one reason that the polymer of the invention exhibits such properties is that due to the presence of the cycloalkyl group in formula (2), which includes at least one halogen atom, the van der Waals force is decreased and the free volume is increased.

The polymer of this embodiment may contain repeating units other than the repeating unit represented by formula (1), but from the viewpoint of highly exhibiting both the oxygen permeability and oxygen/nitrogen selective permeability, the ratio of the content of the repeating unit represented by formula (1) relative to the total repeating units, is preferably 1 wt % or more, more preferably 10 wt % or more and 100 wt % or less, and even more preferably 50 wt % or more and 100 wt % or less.

From the viewpoint of film formability, the weight-average molecular weight ($M_w$) of the polymer is preferably $1\times10^3$ or more and $5\times10^7$ or less, more preferably $1\times10^4$ or more and $2\times10^7$ or less, and even more preferably $1\times10^5$ or more and $1\times10^7$ or less. From the same viewpoint, the number-average molecular weight ($M_n$) of the polymer is preferably $1\times10^3$ or more and $2\times10^7$ or less, more preferably $1\times10^4$ or more and $1\times10^7$ or less, and even more preferably $1\times10^5$ or more and $5\times10^6$ or less. The variance ratio ($M_w/M_n$) which represents the degree of molecular weight distribution of the polymer is preferably 1.0 or more and 10.0 or less, more preferably 1.1 or more and 8.0 or less, and even more preferably 1.1 or more and 5.0 or less. In the invention, the weight-average molecular weight ($M_w$), number-average molecular weight ($M_n$) and variance ratio ($M_w/M_n$) of the polymer are determined based on polystyrene standard, by chromatography using tetrahydrofuran as the solvent. The column used may be "GPC KF-807L" of the KF-800 Series by Shodex.

From the viewpoint of thermostability, the 5% weight reduction temperature ($T_{d5}$) of the polymer is preferably 380° C. or more and 550° C. or less, more preferably 390° C. or more and 500° C. or less, and even more preferably 400° C. or more and 490° C. or less. The 5% weight reduction temperature of the polymer can be measured by thermogravimetry (the apparatus may be, for example, a differential thermal/thermogravimetry apparatus, model DTG-60/60H by Shimadzu Corp.). The temperature-elevating rate during measurement is 10° C./min, with temperature elevation under a nitrogen atmosphere.

[Method for Producing Polymer]

The polymer may be produced, for example, by a method of polymerizing a monomer represented by the following formula (A), or a method of adding $R^2$ as necessary to a polymer obtained by polymerization of a monomer represented by the following formula (B).

[Chemical Formula 7]

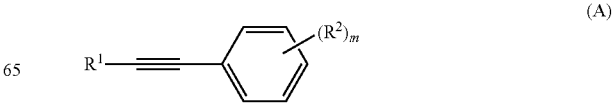

(A)

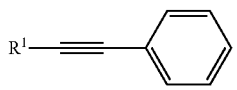
(B)

Polymerization of a monomer represented by formula (A) or (B) can be accomplished, for example, by a method of reaction at from 40 to 100° C. for from 2 to 24 hours, in the presence of a transition metal catalyst.

By polymerization of a monomer represented by formula (B) it is possible to obtain a polymer represented by the following formula (C). Addition of $R^2$ to a polymer represented by formula (C) may be accomplished, for example, by a method of subjecting a di(halogenocycloalkylcarboxy)peroxide represented by the following formula (D) (for example, a di(perfluorocycloalkylcarboxy)peroxide) into contact with the polymer. Specifically, a method of immersing the polymer represented by formula (C) in a solution comprising a di(halogenocycloalkylcarboxy)peroxide is preferred.

[Chemical Formula 8]

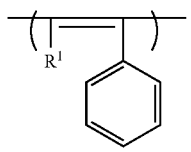
(C)

[Chemical Formula 9]

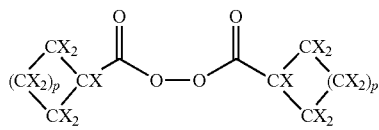
(D)

In formula (D), each X is independently a monovalent group, the plurality of Xs may be the same as or different from each other, at least one X is a monovalent group containing a halogen atom, each p is independently an integer of from 0 to 10, and the two p values may be the same as or different from each other. Examples for X are the same ones mentioned above. In both cycloalkane groups, at least one X is preferably a monovalent group comprising a halogen atom.

Addition of $R^2$ to a polymer represented by formula (C) may be accomplished by a method of subjecting the polymer into contact with a (halogenocycloalkyl)phenyliodoniumtrifluoromethane sulfonate represented by the following formula (E) (for example, a (perfluorocycloalkyl)phenyliodoniumtrifluoromethane sulfonate). Specifically preferred is a method of immersing a polymer represented by formula (C) in a solution of a (halogenocycloalkyl)phenyliodoniumtrifluoromethane sulfonate dissolved in a chloroform and acetonitrile mixed solvent.

[Chemical Formula 10]

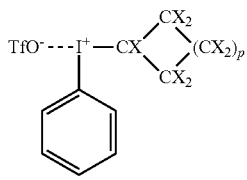
(E)

In formula (E), X and p are the same as in formula (2). That is, each X is independently a monovalent group, the Xs may be the same as or different from each other, at least one X is a monovalent group containing a halogen atom, and p is an integer of from 0 to 10. Also, TfO$^-$ represents a trifluoromethanesulfonate ion.

[Method for Producing Polymer Film]

The polymer film may be produced, for example, by a method of mixing a polymer comprising a repeating unit represented by formula (1) above with a solvent to prepare a film-forming coating solution, and then coating a substrate with the coating solution and evaporating off the solvent.

The solvent used to prepare the film-forming coating solution is preferably one that can dissolve the polymer. Examples of such solvents include organic solvents such as toluene, anisole, chlorobenzene, dichlorobenzene, chloroform and tetrahydrofuran.

The polymer film may be produced by a method of melting the polymer to form a film.

When either or both the polymer represented by formula (D) and/or the polymer represented by formula (E) is used to obtain the polymer comprising the repeating unit represented by formula (1), it is preferable to form the polymer of formula (C) into a film first, and then subject the polymer represented by formula (D) or the polymer represented by formula (E), or both, into contacted with the film of polymer (C).

An air battery according to this embodiment will now be described.

[Air Battery]

FIG. 1 is a schematic cross-sectional view of a coin-shaped air battery 1 employing the aforementioned polymer film as an oxygen permeation film. The air battery comprises an anode case 11, an anode 12, an insulating gasket 13, a separator 14, an air electrode (cathode) 15, a collector 20, an electrolyte solution 19, a water-repellent film 16, an oxygen permeation film 17 and a cathode case 18. The cathode case 18 comprises air permeating sections 18a and a fixed part 18b. The fixed part 18b integrates an oxygen permeation film 17 and a water-repellent film 16, and a power generator composed of an anode case 11, an anode 12, a separator 14, an air electrode (cathode) 15, a collector 20, an insulating gasket 13 and an electrolyte solution 19.

The anode 12 fills the interior of the anode case 11, and a ring-shaped insulating gasket 13 engages with the periphery of the opening of the anode case.

The separator 14 is disposed between the cathode and anodes, and the air electrode (cathode) 15 is disposed with one side facing the separator 14 and the other side facing the collector 20. The stack comprising the anode 12/separator 14/air electrode (cathode) 15 situated in this manner is immersed in the electrolyte solution 19.

The collector 20 is disposed in contact with the air electrode (cathode) 15, while the water-repellent film 16 is disposed with one side facing the collector 20 and the other side facing the oxygen permeation film 17. The oxygen permeation film 17 is disposed with one side facing the water-repellent film 16 and the other side facing the air permeation section 18a of the cathode case 18. The air permeation section 18a of the cathode case is disposed with one side anchored by the oxygen permeation film 17, and the other side in accessible contact with air outside the battery. The air permeation section 18a is a section of the cathode case 18 perpendicular to the direction of oxygen permeation. Air intake holes 110 are formed in the air permeation section 18a. The air permeation section 18a is in a state in which it can contact air on the side opposite the oxygen permeation film 17 side. Air containing oxygen, as the active material for the air electrode (cathode) 15, can be taken in into the battery through the air intake holes 110.

The shape of the air battery 1 is not particularly restricted, and it may be, instead of the aforementioned coin type, a button type, a sheet type, a layered type, a cylindrical type, a flat type, or a rectilinear type. It may also be applied for large sizes to be used in electric vehicles and the like. The anode case 11 may be molded to match the shape of the battery, as described above. For example, in the case of a coin-shaped battery such as shown in FIG. 1, the anode case may be formed using a three-layer clad material comprising nickel, stainless steel and copper, with a press worked metal sheet punched out into a circular cylindrical shape with copper as the side being contact with the electrolyte solution.

The anode 12 used may be a bulky metal used in anode of common air batteries, such as zinc, aluminum or iron. For example, when an aqueous alkali solution is used as the electrolyte solution 19, the metal composing the anode reacts with the $OH^-$ ion in the electrolyte solution during discharge, producing a metal oxide and water and releasing electrons.

The separator 14, which can be used, may be a hydrophilic-treated polyolefin-based nonwoven fabric or fluorine resin. Specifically, examples include polytetrafluoroethylene (PTFE) and polyvinylidene fluoride (PVDF). The separator 14 is situated between the anode 12 and the air electrode (cathode) 15.

Examples of the air electrode (cathode) 15 include a mixture in which active carbon, manganese oxide, conductive carbon, and the like are bound with PTFE. A manganese oxide has a function of increasing the oxidation-reduction power of oxygen in the air battery. Examples of materials with such a function include, in addition to manganese oxides, also iridium, iridium oxides, and iridium oxides containing a metal selected from the group consisting of titanium, tantalum, niobium, tungsten and zirconium. These may also be used in combination. A collector 20 is situated in contact with the side of the cathode 15, opposite the separator 14 side. The side of the air electrode (cathode) 15 in contact with the collector 20 is the side 15S to which a gas having a high concentration of oxygen is supplied, and for example, when an aqueous alkali solution is used as the electrolyte solution 19, the oxygen supplied to the side 15S, the water in the electrolyte solution 19 and the electrons supplied by conduction of the collector 20 from the exterior react with each other during discharge, producing $OH^-$ ions that are supplied to the reaction at the anode 12 described above thereby. From the viewpoint of facilitating occurrence of this reaction, the cathode 15 is preferably in porous or mesh form.

From the viewpoint of increasing the power density of the air battery, the electrolyte solution 19 is preferably an alkali aqueous solution of sodium hydroxide, potassium hydroxide or the like. The air taken in into the air electrode 15 contains a trace amount of carbon dioxide, and there is a concern for the $OH^-$ ons in the electrolyte solution 19 to react with the carbon dioxide, potentially decreasing the $OH^-$ content in the electrolyte solution 19. In response, while an air battery 1 employing the polymer film of this embodiment as the oxygen permeation film 17 also has superior performance of suppressing permeation of carbon dioxide, this performance is exhibited even when an aqueous alkali solution is used. The electrolyte solution 19 may be an aqueous solution comprising the aforementioned alkali at a content of at least 20 mol %.

Examples of the collector 20 include stainless steel, nickel, iron or copper. Since gas with a high oxygen concentration is supplied to the reaction side 15S of the air electrode (cathode) 15 through the collector 20, as mentioned above, the collector 20 is preferably mesh-like or porous.

The water-repellent film 16 situated on the side of the collector 20 opposite the air electrode (cathode) 15 side performs the role of preventing leakage of the electrolyte solution out of the battery, while also blocking water vapor from the air supplied to the air electrode (cathode) 15. Examples of the water-repellent film 20 include porous polyolefin or fluorine resin film. Specifically, the examples include polyethylene, polypropylene, polytetrafluoroethylene (PTFE) and polyvinylidene fluoride (PVDF).

The oxygen permeation film 17 is situated on the side of the water-repellent film 16 opposite the collector 20 side. A polymer film according to the embodiment described above is used as the oxygen permeation film 17. With respect to the air that has passed through the air holes 110 formed on the oxygen permeation section 18a of the cathode case, it is possible to selectively allow permeation of oxygen, due to the oxygen permeation film 17. This results in supply of oxygen-rich gas to the reaction surface 15S of the air electrode 15. It also avoids infiltration of carbon dioxide into the battery, and suppresses the oxygen discharge reaction by carbonates produced thereby, thereby allowing reduction in the battery performance including discharge performance to be further prevented.

From the viewpoint of moldability, the material of the cathode case 18 is preferably, for example, nickel-plated iron or stainless steel. The number of air holes 110 formed in the air permeation section 18a is not particularly restricted, and it may be of a level formed in common air batteries. Specifically, approximately from 2 to 8, for example, may be formed per 1 $cm^2$ of the air permeation section 18a.

The fixed part 18b is attached to the edges and sides of the surface of the collector 20 and to the sides of the insulating gasket 13 near the collector 20, by caulking or the like using a caulking machine or the like, and the entire air battery 1 is thus hermetically sealed and integrated.

An air battery of this embodiment selectively takes in oxygen in the air into the battery, so that an air battery with sufficient discharge performance, and especially an air battery with high output, can be provided. The air battery of this embodiment can be used as a primary battery as described above, or as a secondary battery.

The air battery of this embodiment may be used in a hearing aid, mobile device, mobile PC, automobile, stationary power source, or the like.

Preferred embodiments of the invention will now be explained. However, the invention is in no way limited thereto.

EXAMPLES

The invention will now be explained in greater detail based on examples and comparative examples. However, the invention is not limited to the examples described below.

Example 1

After adding tetra-n-butyltin (215 µL, $6.55 \times 10^{-2}$ mmol) to a solution of tantalum pentachloride (143 mg, 0.399 mmol) in toluene (17.1 mL) under a nitrogen atmosphere, the mixture was stirred at 80° C. for 10 minutes to obtain a toluene solution 1. A separately prepared toluene solution (4.27 mL) containing 4-trimethylsilyldiphenylacetylene (1.07 g, 4.27 mmol) was added to the aforementioned toluene solution 1, and the mixture was stirred at 80° C. for 3 hours to obtain a product A. Chloroform (400 mL) was added to the product A, and the product A was dissolved to obtain a chloroform solution 1. The chloroform solution 1 in which product A was dissolved was added to 2400 mL of an acetone/chloroform mixture (acetone:chloroform=1:5 (volume ratio)), to precipitate the target polymer. The precipitate was recovered by filtration, and dried under reduced pressure overnight to obtain a reddish brown polymer at a yield of 67.8% (0.725 g). The obtained polymer was soluble in common organic solvents such as toluene, chloroform or tetrahydrofuran (hereunder, "THF").

The $^1$H NMR spectrum of the obtained polymer exhibited an extremely broad peak. Observation by $^{13}$C NMR was difficult. The peaks in the IR spectrum were as follows:

IR (Film) ν=3053 ($v_{C-H}$)cm$^{-1}$, 3016-2897 ($v_{Ph-H}$)cm$^{-1}$, 1596 ($v_{C=C}$)cm$^{-1}$, 1492-1387 ($v_{Ph\ C=C}$)cm$^{-1}$, 1247 ($\delta_{SiC-H}$)cm$^{-1}$, 1117 ($v_{Si-CH3}$)cm$^{-1}$, 854 ($_{1,4-Ph}$)cm$^{-1}$, 834 ($v_{Si-CH3}$)cm$^{-1}$, 689 ($v_{Si-Ph}$)cm$^{-1}$, 552 ($v_{Ph\ C-H}$)cm$^{-1}$.

The $M_w$, $M_n$ and $M_w/M_n$ values for the obtained polymer, and the 5% weight reduction temperature ($T_{d5}$), were determined. The results were as follows:
$M_w$=11.3×10$^6$,
$M_n$=5.89×10$^6$,
$M_w/M_n$=1.92,
$T_{d5}$=399° C.

A toluene solution of the obtained polymer was prepared (1.0 wt %) and cast onto a glass plate, and the solvent (toluene) was slowly evaporated off at room temperature. The solvent was evaporated off to dryness to form a film. The film was released from the glass plate to obtain a selfstanding polymer film. The thickness of the polymer film determined with a micrometer was 69 μm. The main reaction formula in this polymerization step is shown below.

[Chemical Formula 11]

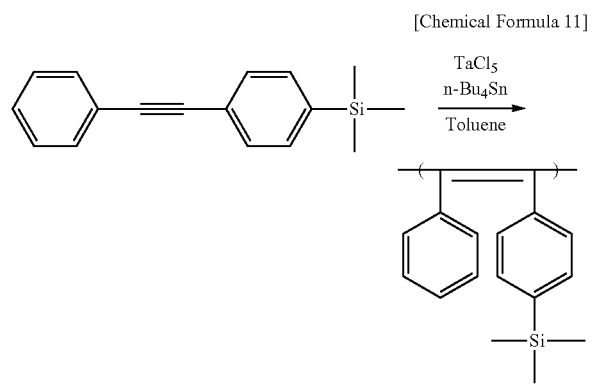

The obtained polymer film (29.0 mg) was then immersed in 2 mL of perfluoro(1,3-dimethylcyclohexane) containing di(perfluorocyclohexylcarboxy)peroxide (3.77 g, 5.80 mmol) under a nitrogen atmosphere, for 5 minutes at room temperature. The film was removed from the solution, further immersed in methanol for 1 hour and then dried at room temperature to obtain a polymer film 1 for Example 1. The main reaction formula in the immersion step is shown below.

[Chemical Formula 12]

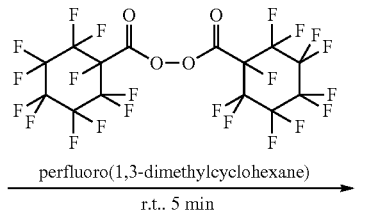

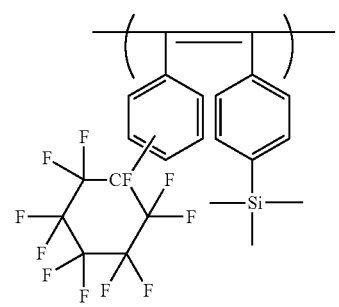

The thickness of the film determined with a micrometer was 87 μm. The peaks in the IR spectrum were as follows: IR (KBr) ν=3057 ($v_{C-H}$)cm$^{-1}$, 3016 ($v_{Ph-H}$)cm$^{-1}$, 2955 ($v_{C-H}$) cm$^{-1}$, 1248 ($\delta_{SiC-H}$)cm$^{-1}$, 1203 ($v_{C-F}$)cm$^{-1}$, 1117 ($v_{Si-CH3}$)cm$^{-1}$, 855 ($v_{Si-CH3}$)cm$^{-1}$.

As mentioned above, it was confirmed that the IR spectrum of the obtained polymer film 1 had a C—F bond-derived peak near 1200 cm$^{-1}$.

[Evaluation of Air Battery Performance (Accelerated Discharge Test)]

A battery in which the polymer film 1 was incorporated as an oxygen permeation film 17, as shown in FIG. 1, was placed in a Tedlar bag containing 10% CO$_2$-90% O$_2$ and set in a charge-discharge tester (Model TYS-30TU00 by Toyo System Co., Ltd.), and then subjected to CC (constant current) discharge at 0.2 mA with cut-off at a final voltage of 0.1V, as a discharge test, by which it was determined that discharge was possible at a high current of 0.2 mA, and therefore a high-output air battery had been obtained.

Comparative Example 1

A polydimethylsiloxane film with a thickness of 50 μm was prepared.

Comparative Example 2

An ethylene tetrafluoride/propylene hexafluoride copolymer film with a thickness of 12.5 μm was prepared.

Comparative Example 3

A 45 μm polyimide film was prepared.

[Evaluation of Polymer Films (Gas Permeation Test)]

The oxygen and nitrogen gas permeability coefficients were measured for the polymer film 1 of Example 1 and the polymer films of Comparative Example 1, Comparative Example 2 and Comparative Example 3. Specifically, the oxygen and nitrogen gas permeability coefficients ($P_{O2}$ and $P_{N2}$, units: cm$^3$ (STP)·cm/cm$^2$·sec·cmHg) were measured using a gas permeability meter (GTR-30X by GTR Tec Corp.) at 23° C., 60% humidity. The measured $P_{O2}$ and $P_{N2}$ values were used to calculate $\alpha_{O2/N2}$ ($=P_{O2}/P_{N2}$), indicating the oxygen/nitrogen selective permeability. Table 1 shows the results of evaluating the polymer film 1 of Example 1 and the films of Comparative Example 1, Comparative Example 2 and Comparative Example 3.

TABLE 1

| | Permeability coefficient* | | Oxygen/nitrogen selective permeability |
|---|---|---|---|
| | $P_{O2}$ | $P_{N2}$ | $\alpha_{O2/N2}$ |
| Example 1 | 1780 | 740 | 2.4 |
| Comp. Ex. 1 | 620 | 280 | 2.2 |
| Comp. Ex. 2 | 5.2 | 1.8 | 2.8 |
| Comp. Ex. 3 | 0.032 | 0.006 | 5.3 |

*Units: $1 \times 10^{-10}$ cm³(STP)cm/cm² · s · cmHg

These results demonstrate that the polymer film 1 of Example 1 can exhibit both a high oxygen permeability coefficient and a high oxygen/nitrogen selective permeability, compared to the polymer films of Comparative Examples 1, 2 and 3. This indicates that an air battery employing the polymer film 1 as an oxygen permeation film 17 can exhibit increased discharge current and be a high-output air battery, while an air battery employing a polymer film of Comparative Example 1, 2 or 3 as an oxygen permeation film cannot be sufficiently discharged and cannot be used as a high-output air battery.

According to the air battery of the invention, therefore, oxygen in the air is selectively taken into the battery, so that an air battery with sufficient discharge performance can be provided.

EXPLANATION OF SYMBOLS

1: Air battery, 11: anode case, 12: anode, 13: insulating gasket, 14: separator, 15: cathode (air electrode), 16: water-repellent film, 17: oxygen permeation film, 18a, 18b: cathode cases, 19: electrolyte solution, 20: collector, 110: air intake hole.

The invention claimed is:

1. An air battery comprising an electrode and a polymer film, wherein the polymer film is disposed on the air intake side of the electrode, and the polymer film is a film of a polymer comprising a repeating unit represented by the following formula (1),

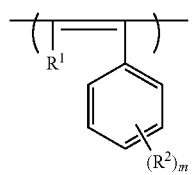

(1)

$R^1$ a halogeno group, a substituted or unsubstituted alkyl group, a substituted or unsubstituted aromatic hydrocarbon group, a substituted or unsubstituted aromatic heterocyclic group, a trialkylsilyl group, or a trialkylgermyl group, each $R^2$ is independently represented by the following formula (2), m is an integer of from 1 to 5, and when a plurality of $R^2$s are present, the $R^2$s are the same or different,

(2)

each X is independently a monovalent group, the plurality of Xs are the same or different, at least one X is a monovalent group containing a halogen atom, and p is an integer of from 0 to 10.

2. The air battery according to claim 1, wherein $R^1$ is an unsubstituted phenyl group, or a substituted phenyl group which is represented by the following formula (3),

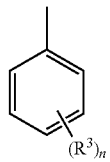

(3)

each $R^3$ independently represents a monovalent group, n is an integer of from 1 to 5, and when a plurality of $R^3$s are present, the $R^3$s are the same or different.

3. The air battery according to claim 2, wherein $R^1$ is a substituted phenyl group represented by the formula (3), and each $R^3$ is independently a halogeno group, a substituted or unsubstituted alkyl group, a substituted or unsubstituted aromatic hydrocarbon group, a substituted or unsubstituted aromatic heterocyclic group, a trialkylsilyl group, or a trialkylgermyl group.

4. The air battery according to claim 2, wherein $R^1$ is a substituted phenyl group represented by the formula (3), and each $R^3$ is independently a halogeno group, a substituted or unsubstituted alkyl group or a trialkylsilyl group.

5. The air battery according to claim 2, wherein $R^1$ is a substituted phenyl group represented by the formula (3), and each $R^3$ is independently a fluoro group, or a trimethylsilyl group.

6. The air battery according to claim 2, wherein $R^1$ is a substituted phenyl group represented by the formula (3), and each $R^3$ is independently a trimethylsilyl group.

7. The air battery according to claim 1, wherein $R^1$ is an unsubstituted phenyl group.

* * * * *